United States Patent
Xu

(10) Patent No.: US 11,350,023 B2
(45) Date of Patent: May 31, 2022

(54) AUTOMATIC FOCUSING METHOD AND DEVICE

(71) Applicant: Hangzhou Hikvision Digital Technology Co., Ltd., Hangzhou (CN)

(72) Inventor: Limin Xu, Hangzhou (CN)

(73) Assignee: HANGZHOU HIKVISION DIGITAL TECHNOLOGY CO., LTD., Hangzhou (CN)

(*) Notice: Subject to any disclaimer, the term of this patent is extended or adjusted under 35 U.S.C. 154(b) by 148 days.

(21) Appl. No.: 16/968,669

(22) PCT Filed: Jan. 28, 2019

(86) PCT No.: PCT/CN2019/073433
§ 371 (c)(1),
(2) Date: Aug. 10, 2020

(87) PCT Pub. No.: WO2019/200998
PCT Pub. Date: Oct. 24, 2019

(65) Prior Publication Data
US 2021/0006707 A1 Jan. 7, 2021

(30) Foreign Application Priority Data
Apr. 20, 2018 (CN) .......................... 201810359904.1

(51) Int. Cl.
*H04N 5/232* (2006.01)
(52) U.S. Cl.
CPC .............................. *H04N 5/23212* (2013.01)
(58) Field of Classification Search
CPC ......... H04N 5/23212; H04N 5/232123; H04N 5/232
See application file for complete search history.

(56) References Cited

U.S. PATENT DOCUMENTS

| 2008/0002960 A1* | 1/2008 | Ito ........................ G03B 13/36 396/125 |
| 2010/0188558 A1* | 7/2010 | Gamadia .......... H04N 5/232123 348/E5.045 |

(Continued)

FOREIGN PATENT DOCUMENTS

| CN | 101493566 | 7/2009 |
| CN | 102647553 | 8/2012 |

(Continued)

OTHER PUBLICATIONS

Notification on Grant of Patent Right for Invention issued in Corresponding Chinese Application No. 201810359904.1, dated Dec. 29, 2020 (No English Translation provided).

(Continued)

*Primary Examiner* — Shahbaz Nazrul
(74) *Attorney, Agent, or Firm* — Norton Rose Fulbright US LLP

(57) ABSTRACT

Autofocus methods and devices are provided. The method includes: controlling a lens group to move at a first speed, and photographing an image at a preset photographing frequency when the lens group moves at the first speed; when a definition of the image photographed by the lens group in a state of moving at the first speed satisfies a preset condition, reducing a moving speed of the lens group to a second speed, and photographing images at the preset photographing frequency when the lens group moves at the second speed; and when a first image with a highest definition is determined in the images photographed by the lens group in a state of moving at the second speed, controlling the lens group to decelerate, and controlling, when the lens group stops moving, the lens group to return to a position of the lens group where the first image was photographed.

17 Claims, 9 Drawing Sheets

(56) References Cited

U.S. PATENT DOCUMENTS

| | | | | |
|---|---|---|---|---|
| 2012/0327293 A1* | 12/2012 | Ollila | ................ | G02B 7/36 |
| | | | | 348/E7.001 |
| 2013/0286278 A1* | 10/2013 | Asano | ............. | H04N 5/2254 |
| | | | | 348/360 |
| 2015/0130988 A1 | 5/2015 | Uenishi | | |
| 2016/0150152 A1 | 5/2016 | Nakamaru | | |
| 2016/0182809 A1* | 6/2016 | Plaza | ................ | G03B 13/36 |
| | | | | 348/349 |

FOREIGN PATENT DOCUMENTS

| | | |
|---|---|---|
| CN | 103513395 | 1/2014 |
| CN | 103728813 | 4/2014 |
| CN | 103945133 | 7/2014 |
| CN | 104301601 | 1/2015 |
| CN | 105391945 | 3/2016 |
| CN | 105635587 | 6/2016 |
| CN | 106375647 | 2/2017 |
| CN | 106921830 | 7/2017 |
| CN | 107395993 | 11/2017 |
| EP | 0630153 | 12/1994 |
| JP | 6087538 B2 | 3/2017 |

OTHER PUBLICATIONS

International Search Report and Written Opinion issued in Corresponding PCT Application No. PCT/CN2019/073433, dated Apr. 11, 2019 (English Translation Provided).

* cited by examiner

AUTOMATIC FOCUSING METHOD AND DEVICE

CROSS REFERENCE TO RELATED APPLICATIONS

The present application is a national phase application under 35 U.S.C. § 371 of International Application No. PCT/CN2019/073433, filed Jan. 28, 2019, which claims the benefit of priority to Chinese patent application No. 201810359904.1, filed with the China National Intellectual Property Administration on Apr. 20, 2018 and entitled "Automatic FOCUSING METHOD AND DEVICE", each of which are incorporated herein by reference in their entirety.

TECHNICAL FIELD

The application relates to the field of electronic technology, and in particular to an autofocus method and device.

BACKGROUND

A heavy-duty PTZ (Pan/Tilt/Zoom) equipped with large-focal electrical driven lens may be used to monitor high-altitude flying objects. However, a lens group in a large focal electrical driven lens is characterized by large stroke, heavy weight and large inertia, and is thus typically driven by a stepper motor.

The speed and running angle of a stepper motor only depend on the frequency and number of pulse signals. When a driver connected to the stepper motor receives a pulse signal, the driver can drive the stepper motor into stepwise rotation by a certain angle in a set direction, each step for a fixed angle. If a stepper motor is used to move the lens group in the large focal length electric lens for a long distance, the moving process will take a long time. A fast focusing cannot be achieved.

The speed of a DC motor is faster. If a DC motor is used to move the lens group in the large focal length electrical driven lens for a long distance, the moving process will take a shorter time. However, a certain period of time is required to stop the high-speed DC motor from running, and the period may vary, depending on situations. As a result, when the DC motor is used to drive the lens group of large-focal electrical driven lens, an overshoot tends to occur. This leads to an inaccurate position of lens group and thus results in auto focus of low accuracy.

SUMMARY

The present application provides the following technical solutions.

An automatic focusing method is provided according to a first aspect of the embodiment of the present application, the method includes:

controlling a lens group to move at a first speed, and photographing an image at a preset photographing frequency when the lens group moves at the first speed;

when a definition of the image photographed by the lens group in a state of moving at the first speed satisfies a preset condition, reducing a moving speed of the lens group to a second speed, and photographing images at the preset photographing frequency when the lens group moves at the second speed; and when a first image with a highest definition is determined in the images photographed by the lens group in a state of moving at the second speed, controlling the lens group to decelerate, and controlling, when the lens group stops moving, the lens group to return to a position of the lens group where the first image was photographed.

Optionally, when a definition of the image photographed by the lens group in a state of moving at the first speed satisfies a preset condition, reducing a moving speed of the lens group to a second speed includes:

when determining for the first time that a definition of a second image photographed by the lens group in a state of moving in the first direction at the first speed is lower than a definition of a third image photographed before the second image and the definition of the third image is lower than a first preset definition threshold, controlling the lens group to decelerate; and controlling, when the lens group stops moving, the lens group to reduce the moving speed to the second speed and to move in a second direction, wherein the second direction is opposite to the first direction; or when a definition of a fourth image photographed by the lens group in a state of moving in the first direction at the first speed is higher than definitions of all images photographed before the fourth image, and the definition of the fourth image is greater than or equal to the first preset definition threshold, controlling the lens group to reduce the moving speed to the second speed and move in the first direction.

Optionally, in a case where the lens group is controlled to reduce the moving speed to the second speed and move in the second direction, the operation of when a first image with a highest definition is determined in images photographed by the lens group in a state of moving at the second speed, controlling the lens group to decelerate, and controlling, when the lens group stops moving, the lens group to return to a position of the lens group where the first image was photographed includes:

taking a position of the lens group where the third image was photographed as an original point, obtaining a first position that is shifted by a first preset distance in the first direction, and obtaining a second position that is shifted by a second preset distance in the second direction;

determining the first image with the highest definition in images photographed between the first position and the second position when the lens group is in a state of moving in the second direction at the second speed; and controlling, when the lens group moves to the second position, the lens group to decelerate, and controlling, when the lens group stops moving, the lens group to return to the position of the lens group where the first image was photographed, wherein the definition of the first image is greater than or equal to the definition of the third image.

Optionally, in a case where the lens group is controlled to reduce the moving speed to the second speed and to move in the second direction, the operation of when a first image with a highest definition is determined in images photographed by the lens group in a state of moving at the second speed, controlling the lens group to decelerate, and controlling, when the lens group stops moving, the lens group to return to a position of the lens group where the first image was photographed includes:

when determining for the first time that a definition of a fifth image photographed by the lens group in a state of moving in the first direction at the second speed is lower than the definition of the first image photographed before the fifth image and a difference between the definition of the first image and the definition of the fifth image is greater than a preset difference threshold, controlling the lens group to decelerate; and controlling, when the lens group stops moving, the lens group to return to the position of the lens group where the first image was photographed.

Optionally, controlling a lens group to move at a first speed includes:

determining, according to a preset photographing magnification and correspondence between definitions of images photographed by the lens group at starting positions of movement and moving speeds, a current photographing magnification and a first speed corresponding to a definition of an image photographed at a starting position of movement from which the lens group is to be moved; and controlling the lens group to move at the first speed.

Optionally, reducing a moving speed of the lens group to a second speed includes:

determining, according to a preset photographing magnification and correspondence between definitions of images photographed by the lens group at starting positions of movement and moving speeds, a current photographing magnification and a second speed corresponding to a definition of an image photographed by at a starting position of movement from which the lens group is to be moved; and reducing the moving speed of the lens group to the second speed.

Optionally, controlling the lens group to return to a position of the lens group where the first image was photographed includes:

determining a third position, wherein the third position is a position shifted from the position of the lens group where the first image was photographed in a direction opposite to a direction in which the lens group moves at the second speed;

controlling the lens group to move to the third position; and controlling the lens group to return to the position of the lens group where the first image was photographed.

Optionally, controlling the lens group to return to a position of the lens group where the first image was photographed includes:

controlling the lens group to move in a direction towards the position of the lens group where the first image was photographed;

determining a braking position from which the lens group is to start braking according to the position of the lens group where the first image was photographed and a preset braking distance;

during the process of controlling the lens group to move in a direction towards the position of the lens group where the first image was photographed, upon each preset detection period, determining a distance to be moved between a current position of the lens group and the braking position, determining a target deceleration distance corresponding to a speed range within which a current speed is according to preset correspondence between speed ranges and deceleration distances, and if a difference between the distance to be moved and the target deceleration distance is less than a preset distance difference, controlling the lens group to start deceleration; and controlling the lens group to start braking when detecting that the lens group decelerates and moves to the braking position, so that the lens group stops at the position of the lens group where the first image was photographed.

An automatic focusing device is provided according to the second aspect of the embodiment of the present application, the device includes:

a moving module, configured for controlling a lens group to move at a first speed, and photographing an image at a preset photographing frequency when the lens group moves at the first speed;

a speed reduction module, configured for reducing, when a definition of the image photographed by the lens group in a state of moving at the first speed satisfies a preset condition, a moving speed of the lens group to a second speed, and photographing images at the preset photographing frequency when the lens group moves at the second speed; and a return module, configured for controlling, when a first image with a highest definition is determined in the images photographed by the lens group in a state of moving at the second speed, the lens group to decelerate, and controlling, when the lens group stops moving, the lens group to return to a position of the lens group where the first image was photographed.

Optionally, the speed reduction module includes:

a first speed reduction unit configured for: when determining for the first time that a definition of a second image photographed by the lens group in a state of moving in the first direction at the first speed is lower than a definition of a third image photographed before the second image and the definition of the third image is lower than a first preset definition threshold, controlling the lens group to decelerate; and controlling, when the lens group stops moving, the lens group to reduce the moving speed to the second speed and to move in a second direction, wherein the second direction is opposite to the first direction; and a second speed reduction unit configured for: when a definition of a fourth image photographed by the lens group in a state of moving in the first direction at the first speed is higher than definitions of all images photographed before the fourth image, and the definition of the fourth image is greater than or equal to the first preset definition threshold, controlling the lens group to reduce the moving speed to the second speed and move in the first direction.

Optionally, the return module includes:

an shifting unit configured for: when the lens group is controlled to reduce the moving speed to the second speed and move in the second direction, taking a position of the lens group where the third image was photographed as an original point, obtaining a first position that is shifted by a first preset distance in the first direction, and obtaining a second position that is shifted by a second preset distance in the second direction, a first determining unit configured for determining the first image with the highest definition in images photographed between the first position and the second position when the lens group is in a state of moving in the second direction at the second speed; and a first return unit, configured for controlling, when the lens group moves to the second position, the lens group to decelerate, and controlling, when the lens group stops moving, the lens group to return to the position of the lens group where the first image was photographed, wherein the definition of the first image is greater than or equal to the definition of the third image.

Optionally, the return module includes:

a second return module, configured for: in a case where the lens group is controlled to reduce the moving speed to the second speed and to move in the second direction, when determining for the first time that a definition of a fifth image photographed by the lens group in a state of moving in the first direction at the second speed is lower than the definition of the first image photographed before the fifth image and a difference between the definition of the first image and the definition of the fifth image is greater than a preset difference threshold, controlling the lens group to decelerate; and controlling, when the lens group stops moving, the lens group to return to the position of the lens group where the first image was photographed.

Optionally, the moving module includes:

a second determining unit, configured for determining, according to a preset photographing magnification and correspondence between definitions of images photographed by the lens group at starting positions of movement and moving speeds, a current photographing magnification and a first speed corresponding to a definition of an image photographed at a starting position of movement from which the lens group is to be moved; and a first moving unit, configured for controlling the lens group to move at the first speed.

Optionally, the speed reduction module includes:

a third determining unit, configured for determining, according to a preset photographing magnification and correspondence between definitions of images photographed by the lens group at starting positions of movement and moving speeds, a current photographing magnification and a second speed corresponding to a definition of an image photographed by at a starting position of movement from which the lens group is to be moved; and a third speed reduction unit, configured for reducing the moving speed of the lens group to the second speed.

Optionally, the return module includes:

a fourth determining unit, configured for determining a third position, wherein the third position is a position shifted from the position of the lens group where the first image was photographed in a direction opposite to a direction in which the lens group moves at the second speed;

a second moving unit, configured for controlling the lens group to move to the third position; and a third return unit, configured for controlling the lens group to return to the position of the lens group where the first image was photographed.

Optionally, the return module includes:

a third moving unit, configured for controlling the lens group to move in a direction towards the position of the lens group where the first image was photographed;

a fifth determining unit, configured for determining a braking position from which the lens group is to start braking according to the position of the lens group where the first image was photographed and a preset braking distance;

a sixth determining unit configured for: during the process of controlling the lens group to move in a direction towards the position of the lens group where the first image was photographed, upon each preset detection period, determining a distance to be moved between a current position of the lens group and the braking position, determining a target deceleration distance corresponding to a speed range within which a current speed is according to preset correspondence between speed ranges and deceleration distances, and if a difference between the distance to be moved and the target deceleration distance is less than a preset distance difference, controlling the lens group to start deceleration; and a braking unit, configured for controlling the lens group to start braking when detecting that the lens group decelerates and moves to the braking position, so that the lens group stops at the position of the lens group where the first image was photographed.

A terminal is provided according to a third aspect of the embodiment of the present application. The terminal includes a processor; and a memory having at least one instruction, at least one program, code set or instruction set stored thereon which, when loaded and executed by the processor, cause the processor to perform the autofocus method described above.

A computer-readable storage medium is provided according to a fourth aspect of the embodiment of the present application. The storage medium has at least one instruction, at least one program, code set or instruction set stored thereon which, when loaded and executed by the processor, cause the processor to perform the autofocus method described above.

A computer program product including instructions is provided according to a fifth aspect of the embodiment of the present application. When the computer program product is executed on a computer, the instructions cause the computer to perform the above-mentioned autofocus method.

The technical solution provided by the embodiment of the present application may have the following advantages.

In the method according to embodiments of the application, a lens group is controlled to move at a first speed, and photograph an image with a preset photographing frequency when moving at the first speed; when a definition of the image photographed by the lens group moving at the first speed satisfies a preset condition, the moving speed of the lens group is reduced to a second speed, and images are photographed at the preset photographing frequency when the lens group moves at the second speed; and when a first image with a highest definition is determined in the images photographed by the lens group in a state of moving at the second speed, the lens group is controlled to decelerate, and controlling, when the lens group stops moving, the lens group to return to a position of the lens group where the first image was photographed. The process of autofocus is divided into two stages, one is to search a focus position quickly and coarsely at the first speed, and the other is to search a focus position slowly and finely at the second speed. In this way, the accuracy of automatic focus may be improved.

It should be understood that the above general description and the following detailed description are only exemplary and explanatory, and do not limit the present application.

BRIEF DESCRIPTION OF THE DRAWINGS

The drawings here, which are incorporated in the specification and form a part of the specification, show embodiments in accordance with the present application and are used to explain the principles of the present application together with the specification. In the drawings.

Figure 1:
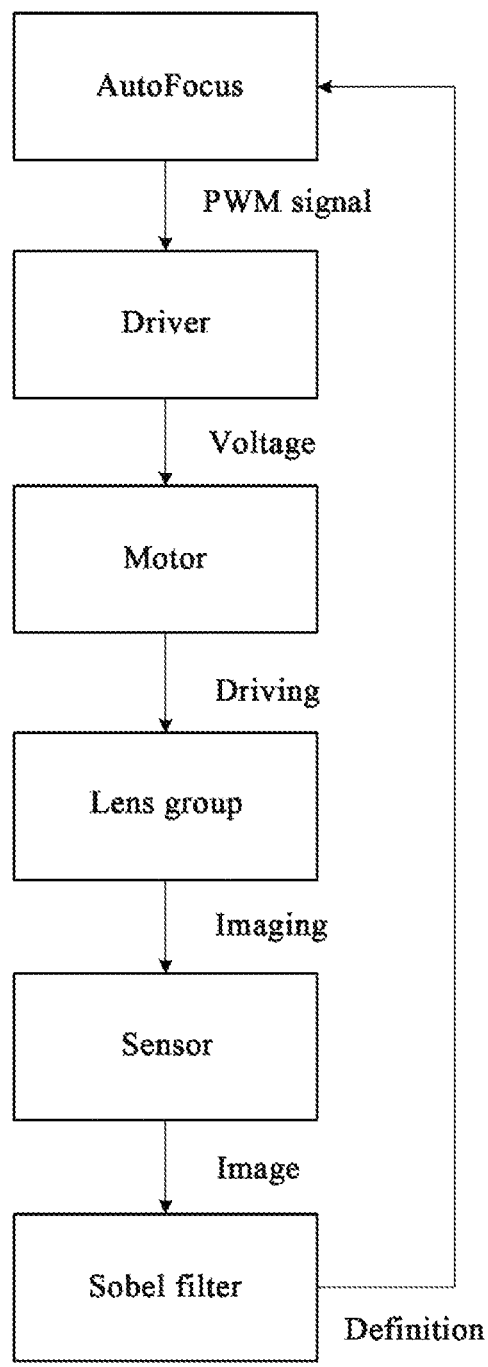
FIG. 1 is a schematic diagram of a processing flow of each of the components in an autofocus process according to an exemplary embodiment.

The specific embodiments of the present application are illustrated with reference to the above drawings, and will be described in more detail later. These drawings and description thereof are not intended to limit the scope of the concept of the present application in any way, but to explain the concept of the present application for those skilled in the art by referring to specific embodiments.

DETAILED DESCRIPTION

Exemplary embodiments will be described in detail herein, examples of which are shown in the drawings. Embodiments may be described with reference to drawings, in which the same numerals represent the same or similar elements unless otherwise indicated. The implementations described in the following exemplary embodiments do not represent all embodiments in accordance with the present application. Rather, they are only examples of devices and methods according to some aspects of the present application as recited in the appended claims.

The embodiment of the present application provides an autofocus method, which may be implemented on a terminal. The terminal may be a heavy-duty PTZ, or other devices that support DC motor lenses.

The terminal may include a processor, a memory and other components. The processor may be a Central Processing Unit (CPU) or the like, and may be used to determine whether the definition of an image photographed in the state where the lens group moves at the first speed satisfies a preset condition. The memory may be Random Access Memory (RAM) or a Flash memory, and may be used to store received data, data required for processing, data generated during processing, such as preset conditions, and definition of images. The terminal may also include a display component which may be used to display photographed images.

The method according to this embodiment may be used in an autofocus process. As shown in FIG. 1, in the auto focus process, a Pulse Width Modulation (PWM) signal may be first generated by an autofocus library (AutoFocus), and input to a driver chip (Driver). The driver chip outputs different voltages to a motor (DcMotor) according to the PWM signal. The DcMotor rotates with different speeds according to the voltages. When the DcMotor rotates, a lens group (Lens) may be driven forward and backward by a transmission gear. When the lens group moves forward and backward, a clear or blurry image may be formed on a photosensitive element (Sensor). Finally, the image is input to an image processor for definition evaluation (for example, Sobel filter may be used to detect the edge of the image), and then the definition of the image is output. The definition may be input again to the AutoFocus, which may generate different PWM signals according to the definition, so as to form a closed-loop system to automatically control the lens group to the position of highest image definition. The image processor may be a Sobel filter. The motor according to this embodiment may be a DC motor. For the heavy-duty PTZ to which the method provided in this embodiment may be applied, the lens group may move forward and backward for a long distance, and is thus driven by the motor.

Figure 2:
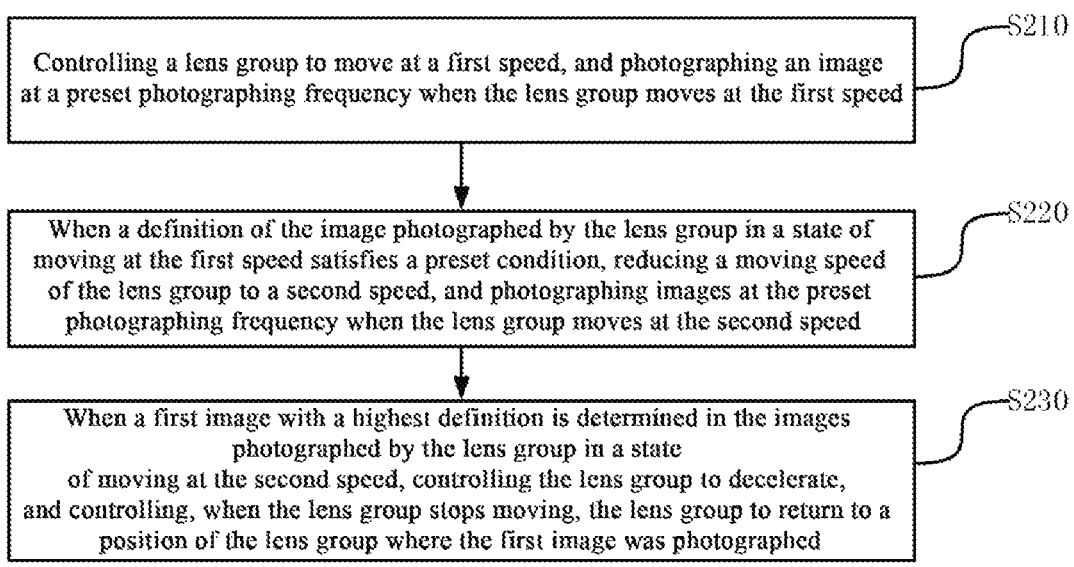
FIG. 2 is a schematic flowchart of an autofocus method according to an exemplary embodiment.

An exemplary embodiment of the present application provides an autofocus method, as shown in FIG. 2, the processing flow of the method may include the following operations.

S210, controlling a lens group to move at a first speed, and photographing an image at a preset photographing frequency when the lens group moves at the first speed.

In an implementation, the first speed may be a maximum speed that a motor may reach, that is, a full speed. When the motor rotates at the maximum speed, it may drive the lens group to move at the maximum speed. Thus controlling the lens group to move is equivalent to controlling the motor to rotate. When the motor rotates, it will drive the lens group to move. The preset photographing frequency may be determined by a fixed frame rate of the photographed image, for example, an image is photographed every 40 ms.

Figure 3:
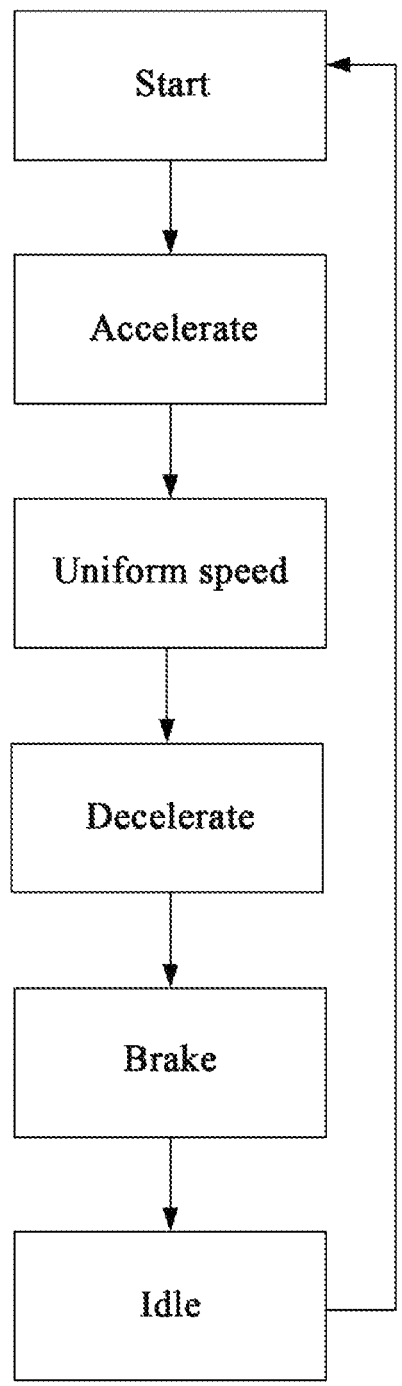
FIG. 3 is a schematic diagram of switching of operation states of a motor according to an exemplary embodiment.

In an implementation, as shown in FIG. 3, there are several stages in the operation process of a motor:

(1) Start. The motor has a starting voltage. The motor may start to rotate when the starting voltage is applied thereto.

(2) Acceleration. When it is detected that the motor starts to rotate, the voltage applied to the motor can be increased to a maximum voltage for normal operation of the motor, so that the motor may accelerate to a maximum speed it can reach.

(3) Uniform speed. When the motor reaches the maximum speed, the maximum voltage for operation applied to the motor is maintained. Therefore, the motor is in uniform rotation with the maximum speed.

(4) Deceleration. The voltage applied to the motor may be reduced to a minimum voltage for normal operation of the motor, i.e., a maintaining voltage, so that the motor starts to decelerate until reaching a very low fixed value. The maintaining voltage may be less than the start voltage.

(5) Brake. The connection between the driver chip and the motor may be kept, but the driver chip is controlled not to supply input voltage to the motor. In this way, the motor forms a discharge circuit through the drive circuit, and generates a reverse electromotive force, so that the current flow in the motor is reversed. The reversed current may produce an force opposite to rotation direction of the motor to brake the motor. As such, the motor can come to a standstill after a small rotation angle.

(6) Idle. When the motor is in standstill, the driver chip may be disconnected from the motor, so that the reverse current in the motor may be discharged quickly through other discharge paths until the current in the motor is 0. If the motor is fully discharged, it can be quickly started next time.

In some cases, some stages in the motor operation process are not necessary. For example, if the motor is not accelerated to the maximum speed but only 25% thereof during the acceleration process before an intent to stop the rotation of the motor, the process may directly enter the braking stage without undergoing the deceleration stage. This is Because 25% of the maximum speed is actually not so fast that it may even fall below the fixed value for deceleration.

Optionally, the operation of controlling the lens group to move at the first speed includes: determining, according to a preset photographing magnification and correspondence between definitions of images photographed by the lens group at starting positions of movement and moving speeds, a current photographing magnification and a first speed corresponding to a definition of an image photographed at a starting position of movement from which the lens group is to be moved; and controlling the lens group to move at the first speed.

In an implementation, for a large photographing magnification, the depth of field of the object at which the lens is aimed would be small, and the first speed may be set slightly reduced, that is, the search for the object may be slowed down. For a small photographing magnification, the depth of field of the object at which the lens is aimed would be large, and the first speed may be set slightly increased, that is, the searching for the object may be accelerated. If the definition of the image photographed by the lens group at the starting position of movement is high, it is considered that the definition peak of the image is to be approached, so the first speed may be slightly reduced. The first speed may be taken between 50% and 100% of the maximum speed.

Step S220, when a definition of the image photographed by the lens group in a state of moving at the first speed satisfies a preset condition, reducing a moving speed of the lens group to a second speed, and photographing images at the preset photographing frequency when the lens group moves at the second speed.

In an implementation, the second speed is less than the first speed, and the second speed may be 25% of the maximum speed that the motor can reach. Therefore, the lens group can directly enter the braking stage from the state of moving at the second speed, without undergoing the deceleration stage.

Optionally, the operation of reducing the moving speed of the lens group to the second speed may include: determining, according to a preset photographing magnification and correspondence between definitions of images photographed by the lens group at starting positions of movement and moving speeds, a current photographing magnification and a second speed corresponding to a definition of an image photographed by at a starting position of movement from which the lens group is to be moved; and reducing the moving speed of the lens group to the second speed.

In an implementation, the second speed may be between 20% and 30% of the maximum speed.

Coarse tuning may be employed to search an object in front of a lens group moving at the first speed (i.e., a quick moving lens). When a definition of an image photographed by the lens group in a state of moving at the first speed satisfies a preset condition, a moving speed of the lens group is reduced to a second speed. As the speed is reduced, fine tuning is employed to search the object in front of the lens. Therefore, the process of autofocus may be divided into two search stages: a coarse search and a fine search.

In a coarse search, an image A with the highest definition may be determined in images photographed by the lens group in a state of moving at the first speed. Then, in a fine search, the lens group is controlled to perform fine search near the position of the lens group where the image A was photographed.

Since the second speed used for the fine search is lower than the first speed used for the coarse search, if an image is photographed every 40 ms, the positions of the lens group to paragraph two adjacent images would be closer for the second speed, so that more positions may be searched. Images photographed in each search may be input to a Sobel filter to detect the definitions thereof.

Step S230, when a first image with a highest definition is determined in the images photographed by the lens group in a state of moving at the second speed, controlling the lens group to decelerate, and controlling, when the lens group stops moving, the lens group to return to a position of the lens group where the first image was photographed.

In an implementation, during the coarse search, an image A with the highest definition may be determined in the images photographed by the lens group when moving at the first speed. Then, during the fine search, the lens group is controlled to perform fine search in the vicinity of the position of the lens group where the image A was photographed. For example, the lens group is controlled to photograph 100 images during the fine search near the position of the lens group where the image A was photographed. Each of these images may be input into the Sobel filter. Sobel filter outputs the definition of the image. A first image with the highest definition is determined from the 100 images. The position of the lens group where the first image was photographed may be obtained, for example, by recording and saving in real time with photography of the image. The lens group is controlled to move to the position of the lens group where the first image was photographed. The process of controlling the lens group to move to the position of the lens group where the first image was photographed may be regarded as fine focusing.

Optionally, the step of controlling the lens group to return to the position of the lens group where the first image was photographed may includes: determining a third position, wherein the third position is a position shifted from the position of the lens group where the first image was photographed in a direction opposite to the direction in which the lens group moves at the second speed; controlling the lens group to move to the third position; and controlling the lens group to return to the position of the lens group where the first image was photographed.

In the implementation, the process of controlling the lens group to move in a direction opposite to the direction of the movement at the second speed may be regarded as a return stroke compensation. The reason for this is to keep the moving direction of the lens group during fine focusing consistent with the moving direction of the lens group during fine search. If no fine search is performed, the moving direction of the lens group during fine focusing is kept consistent with the moving direction of the lens group during coarse search. Specifically, since the gear driving the lens group to move is more than one gear, there is a gap between the gears, so when the moving direction of the lens group is reversed, there will be a return stroke difference. If the return stroke compensation is performed in advance, the return stoke difference may be eliminated and the fine focusing may be more accurate. The lens group may be controlled to move to the third position. After the lens group moves to the third position, fine focusing is performed again.

Figure 4:
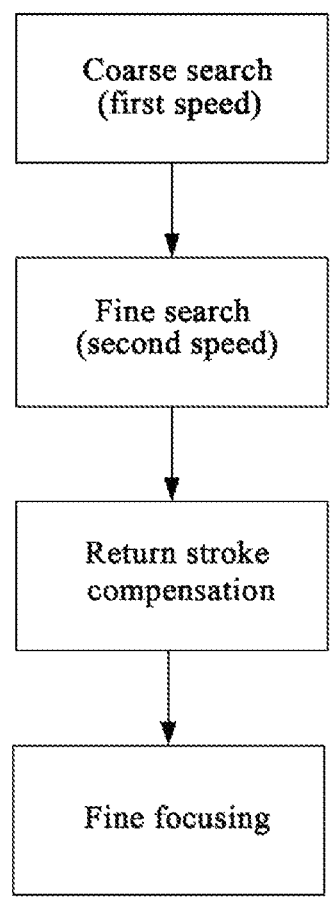
FIG. 4 is a schematic diagram of stages of an autofocus process according to an exemplary embodiment.

In conclusion, as shown in FIG. 4, the autofocus method according to this embodiment may be divided into four stages: coarse search, fine search, return difference compensation and fine focusing.

Optionally, in some cases, in order to further quicken the autofocus, scenes for photography may be classified first. In different scenes, different searches are performed.

In an implementation, three categories of scenes are provided. The first is a detail-rich scene. For example, with lens aimed at sky, a scene for photography of a group of birds flying over the sky is a detail-rich scene. The second is a detail-lacking scene. For example, with lens aimed at sky, a scene for photography of a bird flying over the sky is a detail-lacking scene. The third is a detail-free scene. For example, with lens aimed at sky, a scene without object in the sky is a detail-free scene. The category of a scene can be determined during the coarse search process.

Specifically, the method for determining the category of a scene during the coarse search process may be as follows. First, a first definition threshold and a second definition threshold may be set. The first definition threshold is greater than the second definition threshold. It is noted that, more object edges can be detected in detail-rich scene, and accordingly the Sobel filter outputs a higher value. In a detail-free scene, fewer object edges can be detected, Accordingly, the Sobel filter output a lower value, and the maximum definition would not be high, even in case of focusing. If the maximum definition that the Sobel filter can output is 100, the first definition threshold may be set to 50 and the second definition threshold may be set to 10. That is to say, in the process of coarse search, if the definition of each of images can be detected to be greater than 50, the scene is determined to be a detail-rich scene. In the process of coarse search, if the maximum definition of images is detected to be within 10-50, the scene is determined to a detail-lacking scene. In the process of coarse search, if the maximum definition of the images is detected to be less than 10, the scene is determined to a detail-free scene.

A strategy for image searching may be determined after determining in which one of the three categories a scene falls (the determination is made during the initial movement of the lens group instead of before the movement).

If the lens group is controlled to move from a vertex of a moving track to another vertex of the moving track, image definitions detected during the moving process tend to rise from bottom to a peak and then fall to the bottom again. A peak can be considered as a focus position, that is, a target position for autofocus. In the process of identifying a peak, especially in the coarse tuning process, a peak of 80 may be determined in a case that the image definition rises, for example, from 75 to 80 and then falls to 75. However, at this time, the lens group has been moved away from the peak and would be controlled to return to the peak position later. In this embodiment, the following strategies may be set in advance.

Figure 5A:
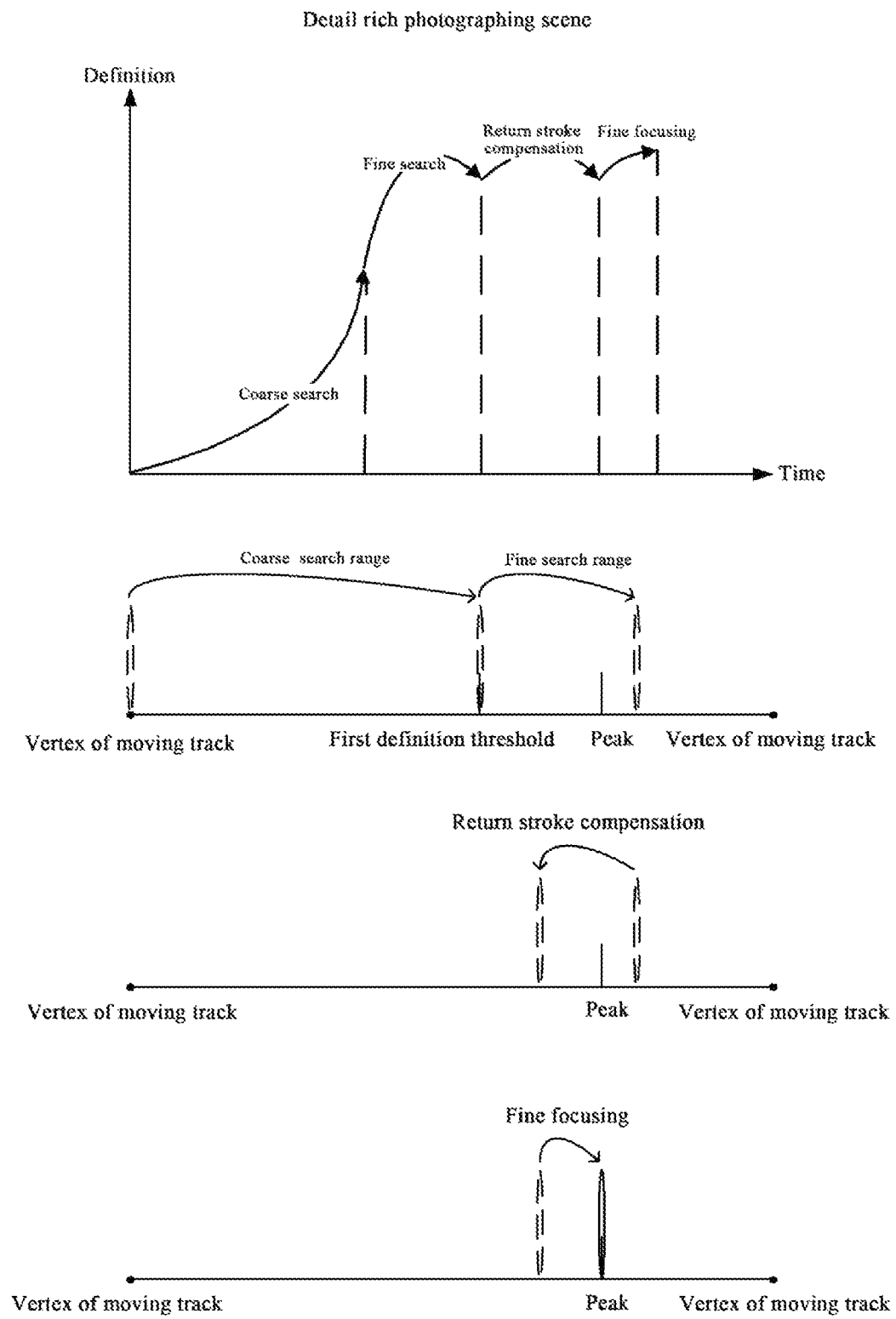
FIG. 5A is a schematic diagram of a moving track of a lens group in a detail-rich scene according to an exemplary embodiment.

(1) As shown in FIG. 5A, in the process of detecting image definition, if no peak is identified until the image definition reaches a first definition threshold, a detail-rich scene can be determined. When it is detected that the definition of the image reaches the first definition threshold, the process may directly enter the fine search, and the first speed is reduced to the second speed. At this time, the direction of the first speed and the second speed are kept consistent.

Optionally, when a definition of a fourth image photographed by the lens group in a state of moving in the first direction at the first speed is higher than definitions of all images photographed before the fourth image and the definition of the fourth image is greater than or equal to the first preset definition threshold, the lens group is controlled to reduce the moving speed to the second speed and to move in the first direction.

This has advantages. The definition of the image is already very high once it reaches the first definition threshold. Therefore, it is very likely that a peak will soon appear. As such, reducing the first speed to the second speed allows a quick identification of peak in the search. This eliminates the need of controlling the lens group to move back and forth for search.

Optionally, in a case where the lens group is controlled to reduce the moving speed to the second speed and to move in the second direction, the operation of when a first image with a highest definition is determined in images photographed by the lens group in a state of moving at the second speed, controlling the lens group to decelerate, and controlling, when the lens group stops moving, the lens group to return to a position of the lens group where the first image was photographed includes: when it is determined for the first time that a definition of a fifth image photographed by the lens group in a state of moving in the first direction at the second speed is lower than the definition of the first image photographed before the fifth image and a difference between the definition of the first image and the definition of the fifth image is greater than a preset difference threshold, controlling the lens group to decelerate; and controlling, when the lens group stops moving, the lens group to return to the position of the lens group where the first image was photographed.

In an implementation, in case that the lens group is controlled to reduce the moving speed to the second speed and move in the first direction, the motor can be controlled to brake once an image definition peak is identified in images photographed by the lens group moving at the second speed. For example, the first definition threshold is 50. When the lens group moves backward, a rise of image definition from 50 to 80, and a drop from 80 to 79 may be detected. When the definition continues to drop from 79 to 75, the definition of 80 may be considered as a peak. The difference of 80 and 75 is a preset difference threshold. When the image definition of 75 is detected, the motor is controlled to start braking. For a definition peak of 80, if the image of the highest definition is photographed when the lens group is at a position of 8.5 m on the moving track, then in the fine focusing, the lens group is controlled to move to the 8.5 m position.

Figure 5B:
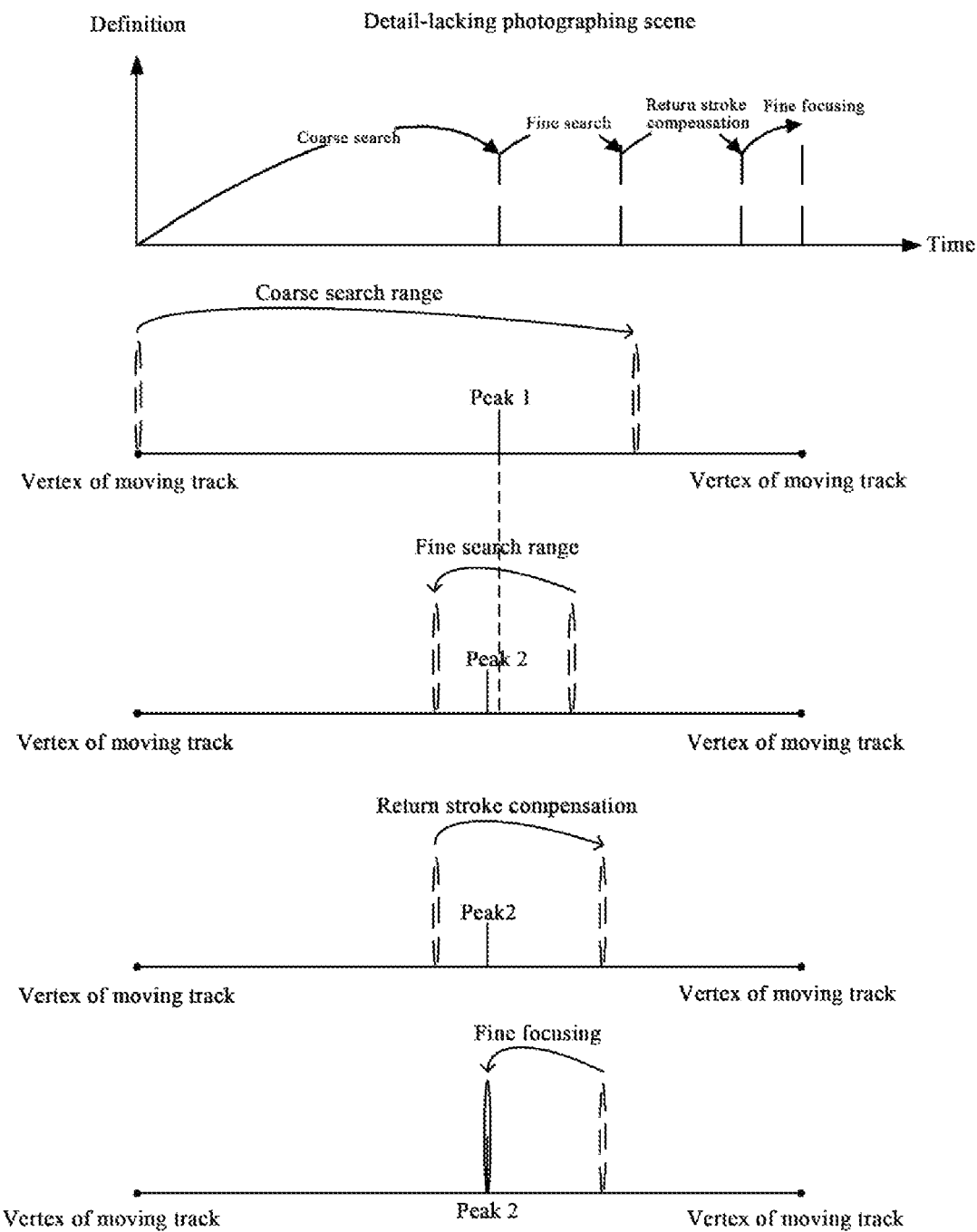
FIG. 5B is a schematic diagram of a moving track of the lens group in a less detail scene according to an exemplary embodiment.

(2) As shown in FIG. 5B, in the process of detecting image definition, if an image definition peak 1 appears before the first definition threshold is reached, a detail-lacking scene can be determined. The peak 1 may have, for example, a value of 45. As the lens group moves subsequently, the image definition begins to drop, for example, to 44. A peak cannot be identified for now, because detection error may occur due to environmental causes. When the definition further drops from 45 to 40 with a difference reaching the preset difference threshold of 5, the definition of 45 is determined to be a real peak. The motor may be then controlled to decelerate. Once decelerating to a preset fixed value, the motor enters the braking stage until the motor is stationary. After the motor becomes stationary, the moving direction of the lens group may be controlled to change for performing fine search. The motor is started and controlled to accelerate until reaching the second speed, so as to drive the lens group to move at the second speed to photograph images. Optionally, when a definition of a fourth image photographed by the lens group in a state of moving in the first direction at the first speed is higher than definitions of all images photographed before the fourth image, and the definition of the fourth image is greater than or equal to the first preset definition threshold, the lens group is controlled to reduce the moving speed to the second speed and move in the first direction.

Optionally, in a case where the lens group is controlled to reduce the moving speed to the second speed and move in the second direction, the operation of when a first image with a highest definition is determined in images photographed by the lens group in a state of moving at the second speed, the operation of controlling the lens group to decelerate, and controlling, when the lens group stops moving, the lens group to return to a position of the lens group where the first image was photographed includes:

taking a position of the lens group where the third image was photographed as an original point, obtaining a first position that is shifted by a first preset distance in the first direction, and obtaining a second position that is shifted by a second preset distance in the second direction; determining the first image with the highest definition in images photographed between the first position and the second position when the lens group is in a state of moving in the second direction at the second speed; and controlling, when the lens group moves to the second position, the lens group to decelerate, and controlling, when the lens group stops moving, the lens group to return to the position of the lens group where the first image was photographed, wherein the definition of the first image is greater than or equal to the definition of the third image.

In an implementation, the position where the third image is photographed is determined, in the coarse search, as the position where an image with the peak definition is photographed. However, because the lens group moves too fast during the coarse search, the measured position for the photography of the image with definition peak 1 is not the real position for the definition peak. The real position for the definition peak may be in front of or behind the position. Coarse search is only to determine possible positions for definition peak of photographed images, but is not required to determine an accurate position. For example, the third image is photographed is at a position of 6.5 m on the moving track. A first position of 5.5 m, i.e., shifted forward by a first preset distance 1 m, can be obtained; and a second position of 7.5 m, i.e., shifted backward by a second preset distance 1 m, can be obtained. It should be noted that the first preset distance and the second preset distance may be the same or different. In this way, after the coarse search, a target range between 5.5 m and 7.5 m can be determined for the fine search. and the position where peak 2 of the fine search can appear is within this range. When the lens group moves in the second direction at the second speed, a first image with the highest definition is determined in images photographed between the first position and the second position. When the lens group moves to the second position, the lens group may be controlled to decelerate. When the lens group stops moving, the lens group may be controlled to return to a position of the lens group where the first image was photographed.

It should be noted that the target range for fine search is between the first position and the second position. However, the stop position of lens group may not be the first position or the second position. Therefore, it is necessary to move the lens group to the first position or the second position, which one is closer. Specifically, the motor may be started, and controlled to accelerate, if allowed, to the maximum speed. When reaching the first position or the second position, the motor may be controlled to decelerate until it decelerates to the second speed.

Optionally, in case where the definition of the second image photographed by the lens group in a state of moving at the first speed is lower than the definition of the third image photographed before the second image, the definition difference is greater than the preset difference threshold, and the definition of the third image is greater than or equal to the second definition threshold and lower than the first definition threshold, the moving direction of the lens group is changed, and the moving speed of the lens group is reduced to the second speed.

In the implementation, if the detail-lacking scene is not to be distinguished from the detail-free scene, the second definition threshold may not be set. If the detail-lacking scene is to be distinguished from the detail-free scene, the second definition threshold may be set.

Figure 5C:
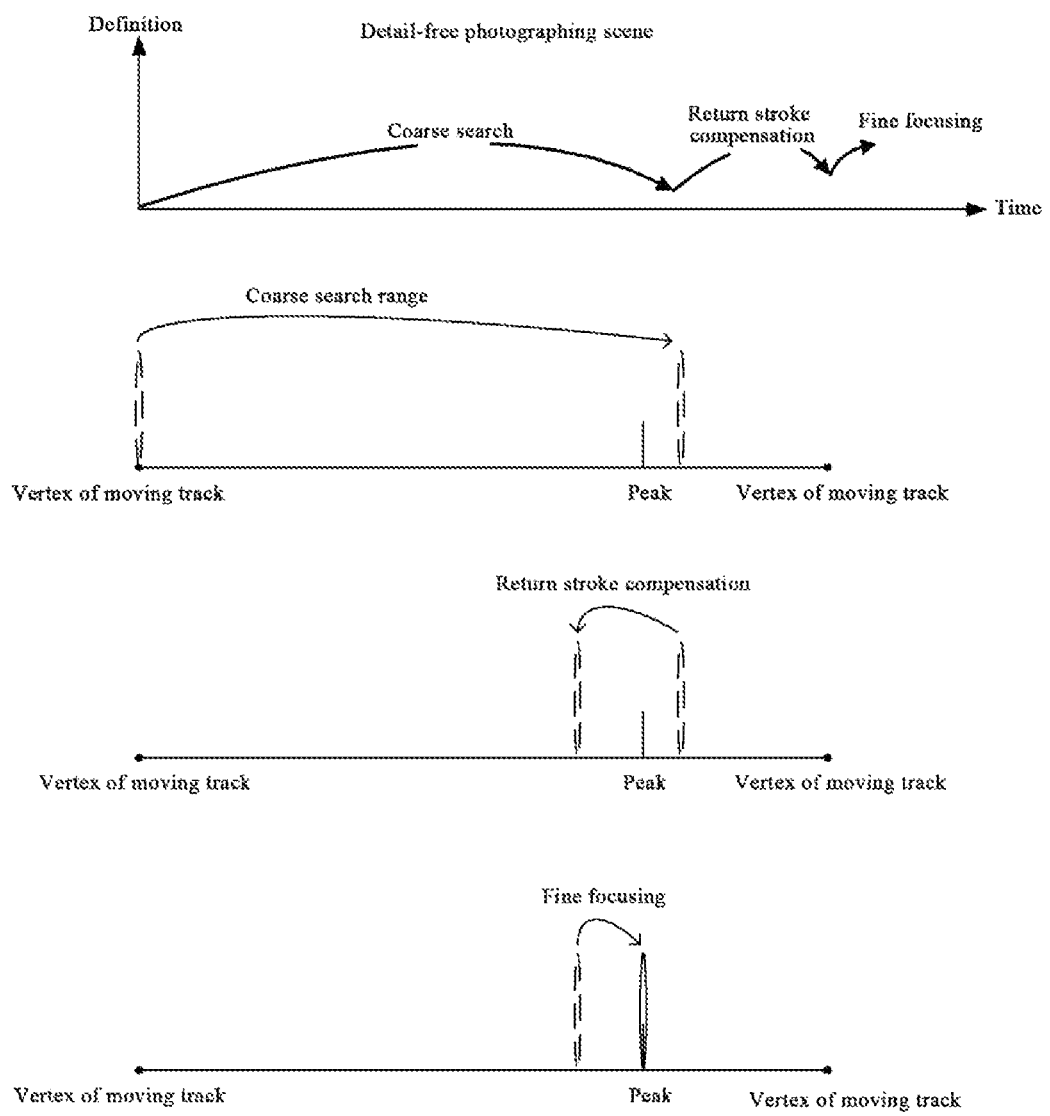
FIG. 5C is a schematic diagram of a moving track of the lens group in a detail-free scene according to an exemplary embodiment.

(3) As shown in FIG. 5C, in the process of image definition detection, if a peak image definition appears before a second preset definition threshold is reached, a detail-free scene can be determined. In the detail-free scene, coarse search may be performed without fine search. Because there may not be any specific objects to be photographed in the detail-free scene, there is no need for accurate focusing operation. After coarse search, the process may directly enter the stage of fine focusing. In this way, the autofocus can be quickened.

Optionally, the method according to this embodiment may further include: when the definition of the second image photographed by the lens group in a state of moving at the first speed is lower than the definition of the third image photographed before the second image, the definition difference is greater than the preset difference threshold, and the definition of the third image is lower than the preset second definition threshold, controlling the lens group to return to a position of the lens group where the third image was photographed.

In the implementation, in the process of coarse search, after determining the photographing position of the image where the definition peak appears, that is, the position of the lens group when the third image was photographed, controlling the lens group to return to a position of the lens group where the third image was photographed. Because there are not so many objects in detail-free scenes, a slightly inaccurate focusing would not produce much difference in the definition of the images photographed. As such, the stage of fine search may be omitted to save the time needed for autofocus.

The fine focusing process applies to the detail-rich scene, the detail-lacking scene and the detail-free scene. In the process of fine focusing, the motor may be controlled to drive the lens group to accurately stop at the position of the lens group where the first image or the third image was photographed. In order to prevent the motor from overshoot, a fine moving process may be designed.

Optionally, the steps of controlling the lens group to return to a position of the lens group where the first image or the third image was photographed includes: controlling the lens group to move in a direction towards the position of the lens group where the first image was photographed; determining a braking position from which the lens group is to start braking according to the position of the lens group where the first image was photographed and a preset braking distance; during the process of controlling the lens group to move in a direction towards the position of the lens group where the first image was photographed, upon each preset detection period, determining a distance to be moved between a current position of the lens group and the braking position, determining a target deceleration distance corresponding to a speed range within which a current speed is according to preset correspondence between speed ranges and deceleration distances, and if a difference between the distance to be moved and the target deceleration distance is less than a preset distance difference, controlling the lens group to start deceleration; and controlling the lens group to start braking when detecting that the lens group decelerates and moves to the braking position, so that the lens group stops at the position of the lens group where the first image was photographed.

Figure 6:
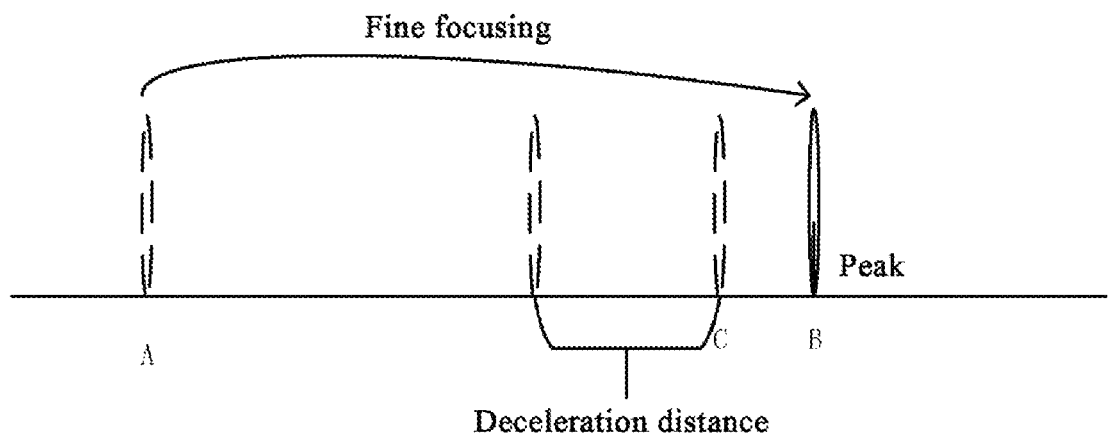
FIG. 6 is a schematic diagram of a moving track of the lens group in a fine focusing process according to an exemplary embodiment.

In an implementation, as shown in FIG. 6, the lens group is at position A, and moves towards position B where the first image was photographed. If a preset fixed value of the deceleration process is 25% of the maximum speed, the braking distance is a fixed value. For example, the braking distance may be 0.5 m, and the braking position may be position C. Assuming that the distance between position A and position B is 3 m, with the braking distance excluded, the start, acceleration and deceleration of the motor is to be accomplished in the remaining 2.5 m. Within this 2.5 m distance, the motor starts and accelerates, driving the lens group to move from position A with increasing speed. Upon each preset detection period, a distance to be moved between a current position of the lens group and a braking position is determined, and a deceleration distance (i.e. target deceleration distance) corresponding to a speed range for a current speed is determined according to preset correspondence between preset speed ranges and deceleration distances. The target deceleration distance is the distance required for deceleration from the current speed to the target speed. For example, the speed may be divided into 10 levels, and there is a corresponding deceleration distance for each speed level. For example, a speed of 20 m/s may correspond to a deceleration distance of 1.4 m.

After a target deceleration distance corresponding to a speed range for a current speed is determined, a determination is made as to whether the difference between the distance to be moved and the target deceleration distance is less than the preset distance difference, that is, whether the distance to be moved is enough for deceleration, while keeping the deceleration process from being started too early. After determining that the difference between the distance to be moved and the target deceleration distance is less than the preset distance difference, the lens group is controlled to decelerate to the target speed (such as 25% of the maximum speed). When 25% of the maximum speed is reached, the lens group may happen to be at position C, or have not reached position C yet. If the lens group has not reached position C, then the lens group moves to position C at 25% of the maximum speed, and the braking is started at the position C. This ensures that the lens group may stop at the position B after moving over the braking distance, thereby completing the process of fine focusing.

In the method according to the embodiment, a lens group is controlled to move at a first speed, and photograph an image with a preset photographing frequency when moving at the first speed. When a definition of the image photographed by the lens group moving at the first speed satisfies a preset condition, the moving speed of the lens group is reduced to a second speed. Images are photographed at the preset photographing frequency when the lens group moves at the second speed. When a first image with a highest definition is determined in the images photographed by the lens group in a state of moving at the second speed, the lens group is controlled to decelerate, and controlling, when the lens group stops moving, the lens group to return to a position of the lens group where the first image was photographed. The process of autofocus is divided into two stages, one is to search a focus position quickly and coarsely at the first speed, and the other is to search a focus position slowly and finely at the second speed. In this way, the accuracy of automatic focus may be improved.

Figure 7:
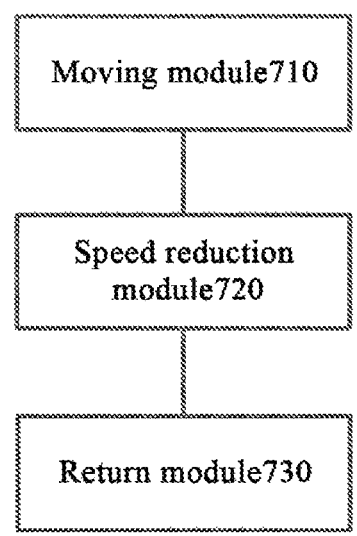
FIG. 7 is a schematic structural diagram of an autofocus device according to an exemplary embodiment.

Another exemplary embodiment of the present application provides an autofocus device, as shown in FIG. 7, the device may include:

a moving module 710, configured for controlling a lens group to move at a first speed, and photographing an image at a preset photographing frequency when the lens group moves at the first speed;

a speed reduction module 720, configured for reducing, when a definition of the image photographed by the lens group in a state of moving at the first speed satisfies a preset condition, a moving speed of the lens group to a second speed, and photographing images at the preset photographing frequency when the lens group moves at the second speed;

a return module 730, configured for configured for controlling, when a first image with a highest definition is determined in the images photographed by the lens group in a state of moving at the second speed, the lens group to decelerate, and controlling, when the lens group stops moving, the lens group to return to a position of the lens group where the first image was photographed.

Optionally, the speed reduction module 720 includes:

a first speed reduction unit configured for: when determining for the first time that a definition of a second image photographed by the lens group in a state of moving in the first direction at the first speed is lower than a definition of a third image photographed before the second image and the definition of the third image is lower than a first preset definition threshold, controlling the lens group to decelerate; and controlling, when the lens group stops moving, the lens group to reduce the moving speed to the second speed and to move in a second direction, wherein the second direction is opposite to the first direction; and a second speed reduction unit configured for: when a definition of a fourth image photographed by the lens group in a state of moving in the first direction at the first speed is higher than definitions of all images photographed before the fourth image, and the definition of the fourth image is greater than or equal to the first preset definition threshold, controlling the lens group to reduce the moving speed to the second speed and move in the first direction.

Optionally, the return module 730 includes:

an shifting unit configured for: when the lens group is controlled to reduce the moving speed to the second speed and move in the second direction, taking a position of the lens group where the third image was photographed as an original point, obtaining a first position that is shifted by a first preset distance in the first direction, and obtaining a second position that is shifted by a second preset distance in the second direction, a first determining unit configured for determining the first image with the highest definition in images photographed between the first position and the second position when the lens group is in a state of moving in the second direction at the second speed;

a first return unit, configured for controlling, when the lens group moves to the second position, the lens group to decelerate, and controlling, when the lens group stops moving, the lens group to return to the position of the lens group where the first image was photographed, wherein the definition of the first image is greater than or equal to the definition of the third image.

Optionally, the return module 730 includes:

a second return module, configured for: in a case where the lens group is controlled to reduce the moving speed to the second speed and to move in the second direction, when determining for the first time that a definition of a fifth image photographed by the lens group in a state of moving in the first direction at the second speed is lower than the definition of the first image photographed before the fifth image and a difference between the definition of the first image and the definition of the fifth image is greater than a preset difference threshold, controlling the lens group to decelerate; and controlling, when the lens group stops moving, the lens group to return to the position of the lens group where the first image was photographed.

Optionally, the moving module 710 includes:

a second determining unit, configured for determining, according to a preset photographing magnification and correspondence between definitions of images photographed by the lens group at starting positions of movement and moving speeds, a current photographing magnification and a first speed corresponding to a definition of an image photographed at a starting position of movement from which the lens group is to be moved; and a first moving unit, configured for controlling the lens group to move at the first speed.

Optionally, the speed reduction module 720 includes:

a third determining unit, configured for determining, according to a preset photographing magnification and correspondence between definitions of images photographed by the lens group at starting positions of movement and moving speeds, a current photographing magnification and a second speed corresponding to a definition of an image photographed by at a starting position of movement from which the lens group is to be moved; and a third speed reduction unit, configured for reducing the moving speed of the lens group to the second speed.

Optionally, the return module 730 includes:

a fourth determining unit, configured for determining a third position, wherein the third position is a position shifted from the position of the lens group where the first image was photographed in a direction opposite to a direction in which the lens group moves at the second speed;

a second moving unit, configured for controlling the lens group to move to the third position; and a third return unit, configured for controlling the lens group to return to the position of the lens group where the first image was photographed.

Optionally, the return module 730 includes:

a third moving unit, configured for controlling the lens group to move in a direction towards the position of the lens group where the first image was photographed;

a fifth determining unit, configured for determining a braking position from which the lens group is to start braking according to the position of the lens group where the first image was photographed and a preset braking distance;

a sixth determining unit configured for: during the process of controlling the lens group to move in a direction towards the position of the lens group where the first image was photographed, upon each preset detection period, determining a distance to be moved between a current position of the lens group and the braking position, determining a target deceleration distance corresponding to a speed range within which a current speed is according to preset correspondence between speed ranges and deceleration distances, and if a difference between the distance to be moved and the target deceleration distance is less than a preset distance difference, controlling the lens group to start deceleration; and a braking unit, configured for controlling the lens group to start braking when detecting that the lens group decelerates and moves to the braking position, so that the lens group stops at the position of the lens group where the first image was photographed.

With regard to the device in the above embodiment, operations performed by the modules have been described in detail in the method embodiment, and is thus not described in detail here.

The process of autofocus is divided into two stages, one is a quick and coarse search of focus position at the first speed, and the other is a slow and fine search of focus position at the second speed. In this way, the accuracy of autofocus may be improved.

It is noted that, above division of functional modules is used as an example for illustration when the autofocus device according to the above embodiment is in autofocus. In practical applications, the above functions may be distributed among different functional modules as desired. That is, the internal structure of the terminal is divided into different functional modules to complete all or part of the functions described above. In addition, the autofocus device according to the above embodiment is based on the same concept as the autofocus method, the implementation of which can be known with reference to the method embodiment, and is thus not described here.

Figure 8:
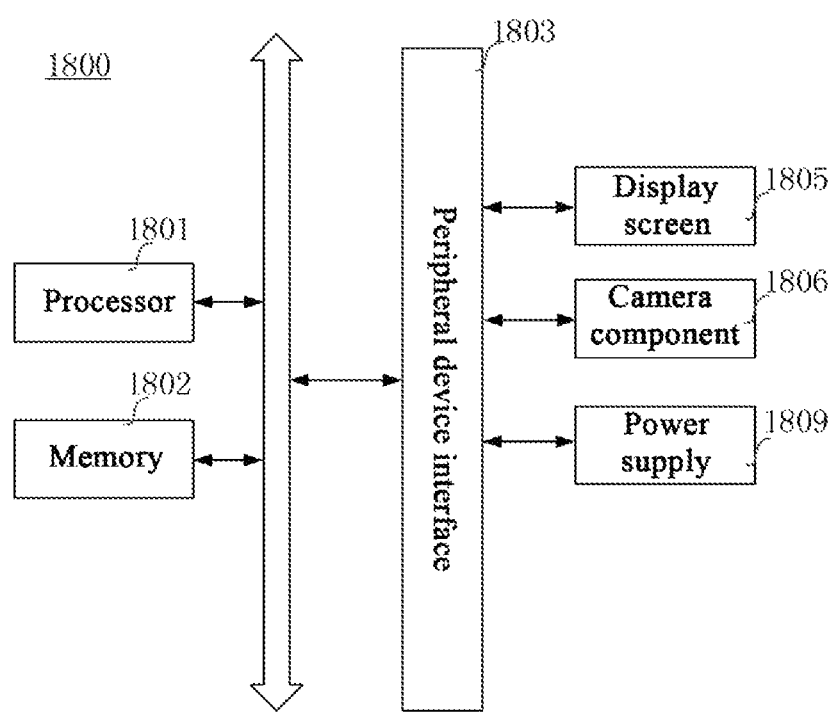
FIG. 8 is a schematic structural diagram of a terminal according to an exemplary embodiment.

FIG. 8 shows a structural block diagram of a terminal 1800 according to an exemplary embodiment of the present application. The terminal 1800 may also be referred to as a heavy-duty PTZ.

Generally, the terminal 1800 includes a processor 1801 and a memory 1802.

The processor 1801 may have one or more processing cores, for example, 4 cores or 8 cores. The processor 1801 may be embodied in hardware, for example, in form of a Digital Signal Processor (DSP), Field Programmable Gate Array (FPGA) or a Programmable Logic Array (PLA). The processor 1801 may also include a main processor and a coprocessor. The main processor is a processor for processing data in wake-up state, also called a Central Processing Unit (CPU), and the coprocessor is a low-power processor for processing data in standby state. In some embodiments, the processor 1801 may be integrated with a Graphics Processing Unit (GPU), which is used for rendering and drawing the content required to be displayed on display screen. In some embodiments, processor 1801 may also include an AI processor for processing computing operations related to machine learning.

The memory 1802 may include one or more computer-readable storage media, which may be non-transitory. The memory 1802 may also include high-speed random access memory and non-volatile memory, such as one or more disk storage devices and flash storage devices. In some embodiments, a non-transitory computer-readable storage medium in the memory 1802 is used to store at least one instruction which, when executed by the processor 1801, causes the processor 1801 to implement the autofocus method according to the method embodiment in the present application.

In some embodiments, the terminal 1800 may also include: a peripheral device interface 1803 and at least one peripheral device. The processor 1801, the memory 1802 and the peripheral device interface 1803 may be connected through a bus or a signal line. Each of peripheral devices may be connected with the peripheral device interface 1803 through a bus, a signal line or a circuit board. Specifically, the peripheral devices may include at least one of a touch display screen 1805, a camera component 1806, and a power supply 1809.

The peripheral device interface 1803 may also be used to connect at least one peripheral device related to Input/Output (I/O) to the processor 1801 and the memory 1802. In some embodiments, the processor 1801, the memory 1802, and the peripheral device interface 1803 are integrated on the same chip or circuit board. In other embodiments, any one or two of the processor 1801, the memory 1802, and the peripheral device interface 1803 may be implemented on a separate chip or circuit board. Embodiments are not limited in this aspect.

The display screen 1805 is used to display a User Interface (UI), which may include graphics, text, icons, videos, and any combination of thereof. When the display screen 1805 is a touch display screen, the display screen 1805 may further be able to acquire touch signals on or above the surface of the display screen 1805. The touch signals may be input to the processor 1801 as control signal for processing. In this case, the display screen 1805 may also be used to provide a virtual button and/or a virtual keyboard, also referred to as a soft button and/or a soft keyboard. In some embodiments, there may be one display screen 1805, which is disposed on the front panel of the terminal 1800. In other embodiments, there may be at least two display screens 1805, respectively disposed on different surfaces of the terminal 1800 or in a folded design. In other embodiments, the display screen 1805 may be a flexible display screen, which is disposed on a curved or folded surface of the terminal 1800. The display screen 1805 may even be designed to have a non-rectangular shape, that is, a special-shaped screen. The display screen 1805 may be a Liquid Crystal Display (LCD), Organic Light-Emitting Diode (OLED) or a display made of other materials.

The camera component 1806 is used for capturing images or videos. Optionally, the camera component 1806 may include a front camera and a rear camera. Generally, the front camera is set on the front panel of the terminal, and the rear camera is set on the back of the terminal. In some embodiments, there are at least two rear cameras, selected from a main camera, a depth of field camera, a wide-angle camera and a telephoto camera, so as to achieve the fusion of the main camera and the depth of field camera to achieve the background virtualization function, the fusion of the main camera and the wide-angle camera to achieve panoramic photographing and Virtual Reality (VR) photographing functions or other fusion photographing functions. In some embodiments, the camera component 1806 may also include a flashlight. The flashlight may be a single color temperature flashlight or a dual color temperature flashlight. The dual color temperature flashlight refers to a combination of warm flashlight and cold flashlight, which may be used for light compensation under different color temperatures.

The power supply 1809 is used to supply power to various components in the terminal 1800. The power supply 1809 may be an alternating current, direct current, disposable battery, or rechargeable battery. When the power supply 1809 includes a rechargeable battery, the rechargeable battery may be a wired rechargeable battery or a wireless rechargeable battery. The wired rechargeable battery is a battery charged through a wired line, and the wireless rechargeable battery is a battery charged through a wireless coil. The rechargeable battery may also be used to support fast charging technology.

Optical sensors are used to collect ambient light intensity. In one embodiment, the processor 1801 may also dynamically adjust photographing parameters of the camera component 1806 according to the ambient light intensity collected by the optical sensor.

It will be understood by those skilled in the art that, the structure shown in FIG. 8 is not a limitation of terminal 1800. The terminal may include more or fewer components than those illustrated. Further, some of the components may be combined or placed in different arrangements.

In yet another embodiment according to the present application, a computer-readable storage medium is provided. The computer-readable storage medium stores at least one instruction, at least one program, code set or instruction. When the at least one instruction, the at least one program, code set or instruction set are loaded and executed by the processor, the processor is caused to perform any autofocus method in the above embodiments.

In yet another embodiment according to the present application, a computer program product containing instructions is provided. When the computer program product is executed on a computer, the computer is caused to perform any autofocus method in the above embodiments.

After considering the specification and practice of the application disclosed herein, those skilled in the art will easily derive other embodiments of the application. The present application intends to cover any variation, use or adaptation of the application, which follow the general principles of the application and include common general knowledges or conventional technical means in the technical field not disclosed in the application. The specification and the embodiments are only regarded as examples, and the true scope and spirit of the application are indicated by the appended claims.

It should be understood that the present application is not limited to the precise structure described above and shown in the drawings, and various modifications and changes may be made without departing from the scope thereof. The scope of this application is limited only by the appended claims.

What is claimed is:

1. An autofocus method, comprising:
controlling a lens group to move at a first speed, and photographing an image at a preset photographing frequency when the lens group moves at the first speed;
when a definition of the image photographed by the lens group in a state of moving at the first speed satisfies a preset condition, reducing a moving speed of the lens group to a second speed, and photographing images at the preset photographing frequency when the lens group moves at the second speed; and
when a first image with a highest definition is determined in the images photographed by the lens group in a state of moving at the second speed, controlling the lens group to decelerate, and controlling, when the lens group stops moving, the lens group to return to a position of the lens group where the first image was photographed.

2. The method according to claim 1, wherein, when a definition of the image photographed by the lens group in a state of moving at the first speed satisfies a preset condition, reducing a moving speed of the lens group to a second speed comprises:
when determining for the first time that a definition of a second image photographed by the lens group in a state of moving in the first direction at the first speed is lower than a definition of a third image photographed before the second image and the definition of the third image is lower than a first preset definition threshold, controlling the lens group to decelerate; and controlling, when the lens group stops moving, the lens group to reduce the moving speed to the second speed and to move in a second direction, wherein the second direction is opposite to the first direction; or
when a definition of a fourth image photographed by the lens group in a state of moving in the first direction at the first speed is higher than definitions of all images photographed before the fourth image, and the definition of the fourth image is greater than or equal to the first preset definition threshold, controlling the lens group to reduce the moving speed to the second speed and move in the first direction.

3. The method according to claim 2, wherein, in a case where the lens group is controlled to reduce the moving speed to the second speed and move in the second direction, the operation of when a first image with a highest definition is determined in images photographed by the lens group in a state of moving at the second speed, controlling the lens group to decelerate, and controlling, when the lens group stops moving, the lens group to return to a position of the lens group where the first image was photographed comprises:

taking a position of the lens group where the third image was photographed as an original point, obtaining a first position that is shifted by a first preset distance in the first direction, and obtaining a second position that is shifted by a second preset distance in the second direction;

determining the first image with the highest definition in images photographed between the first position and the second position when the lens group is in a state of moving in the second direction at the second speed; and controlling, when the lens group moves to the second position, the lens group to decelerate, and controlling, when the lens group stops moving, the lens group to return to the position of the lens group where the first image was photographed, wherein the definition of the first image is greater than or equal to the definition of the third image.

4. The method according to claim 2, wherein, in a case where the lens group is controlled to reduce the moving speed to the second speed and to move in the second direction, the operation of when a first image with a highest definition is determined in images photographed by the lens group in a state of moving at the second speed, controlling the lens group to decelerate, and controlling, when the lens group stops moving, the lens group to return to a position of the lens group where the first image was photographed comprises:

when determining for the first time that a definition of a fifth image photographed by the lens group in a state of moving in the first direction at the second speed is lower than the definition of the first image photographed before the fifth image and a difference between the definition of the first image and the definition of the fifth image is greater than a preset difference threshold, controlling the lens group to decelerate; and controlling, when the lens group stops moving, the lens group to return to the position of the lens group where the first image was photographed.

5. The method according to claim 1, wherein, controlling a lens group to move at a first speed comprises:

determining, according to a preset photographing magnification and correspondence between definitions of images photographed by the lens group at starting positions of movement and moving speeds, a current photographing magnification and a first speed corresponding to a definition of an image photographed at a starting position of movement from which the lens group is to be moved; and controlling the lens group to move at the first speed.

6. The method according to claim 1, wherein, reducing a moving speed of the lens group to a second speed comprises:

determining, according to a preset photographing magnification and correspondence between definitions of images photographed by the lens group at starting positions of movement and moving speeds, a current photographing magnification and a second speed corresponding to a definition of an image photographed by at a starting position of movement from which the lens group is to be moved; and reducing the moving speed of the lens group to the second speed.

7. The method according to claim 1, wherein, controlling the lens group to return to a position of the lens group where the first image was photographed comprises:

determining a third position, wherein the third position is a position shifted from the position of the lens group where the first image was photographed in a direction opposite to a direction in which the lens group moves at the second speed;

controlling the lens group to move to the third position; and controlling the lens group to return to the position of the lens group where the first image was photographed.

8. The method according to claim 1, wherein controlling the lens group to return to a position of the lens group where the first image was photographed comprises:

controlling the lens group to move in a direction towards the position of the lens group where the first image was photographed;

determining a braking position from which the lens group is to start braking according to the position of the lens group where the first image was photographed and a preset braking distance;

during the process of controlling the lens group to move in a direction towards the position of the lens group where the first image was photographed, upon each preset detection period, determining a distance to be moved between a current position of the lens group and the braking position, determining a target deceleration distance corresponding to a speed range within which a current speed is according to preset correspondence between speed ranges and deceleration distances, and if a difference between the distance to be moved and the target deceleration distance is less than a preset distance difference, controlling the lens group to start deceleration; and controlling the lens group to start braking when detecting that the lens group decelerates and moves to the braking position, so that the lens group stops at the position of the lens group where the first image was photographed.

9. An autofocus device, comprising:

a moving module, configured for controlling a lens group to move at a first speed, and photographing an image at a preset photographing frequency when the lens group moves at the first speed;

a speed reduction module, configured for reducing, when a definition of the image photographed by the lens group in a state of moving at the first speed satisfies a preset condition, a moving speed of the lens group to a second speed, and photographing images at the preset photographing frequency when the lens group moves at the second speed; and a return module, configured for controlling, when a first image with a highest definition is determined in the images photographed by the lens group in a state of moving at the second speed, the lens group to decelerate, and controlling, when the lens group stops moving, the lens group to return to a position of the lens group where the first image was photographed.

10. The device according to claim 9, wherein the speed reduction module comprises:

a first speed reduction unit configured for: when the lens group moves in the first direction at the first speed, for the first time that a definition of a second image photographed is lower than a definition of a third image photographed before the second image and the definition of the third image is lower than a first preset definition threshold, controlling the lens group to decelerate; and controlling, when the lens group stops moving, the lens group to reduce the moving speed to the second speed and to move in a second direction, wherein the second direction is opposite to the first direction; and a second speed reduction unit configured for: when a definition of a fourth image photographed by the lens group in a state of moving in the first direction at the first speed is higher than definitions of all images photographed before the fourth image, and the definition of the fourth image is greater than or equal to the first preset definition threshold, controlling the lens group to reduce the moving speed to the second speed and move in the first direction.

11. The device according to claim 10, wherein the return reduction module comprises:

an shifting unit configured for: when the lens group is controlled to reduce the moving speed to the second speed and move in the second direction, taking a position of the lens group where the third image was photographed as an original point, obtaining a first position that is shifted by a first preset distance in the first direction, and obtaining a second position that is shifted by a second preset distance in the second direction, a first determining unit configured for determining the first image with the highest definition in images photographed between the first position and the second position when the lens group is in a state of moving in the second direction at the second speed;

a first return module, configured for controlling, when the lens group moves to the second position, the lens group to decelerate, and controlling, when the lens group stops moving, the lens group to return to the position of the lens group where the first image was photographed, wherein the definition of the first image is greater than or equal to the definition of the third image.

12. The device according to claim 10, wherein the return reduction module comprises:

a second return module, configured for: in a case where the lens group is controlled to reduce the moving speed to the second speed and to move in the second direction, when the lens group moves in the first direction at the second speed, for the first time that a definition of a fifth image photographed is lower than the definition of the first image photographed before the fifth image and a difference between the definition of the first image and the definition of the fifth image is greater than a preset difference threshold, controlling the lens group to decelerate; and controlling, when the lens group stops moving, the lens group to return to the position of the lens group where the first image was photographed.

13. The device according to claim 9, wherein the moving module comprises:

a second determining unit, configured for determining, according to a preset photographing magnification and correspondence between definitions of images photographed by the lens group at starting positions of movement and moving speeds, a current photographing magnification and a first speed corresponding to a definition of an image photographed at a starting position of movement from which the lens group is to be moved; and a first moving unit, configured for controlling the lens group to move at the first speed.

14. The device according to claim 9, wherein the speed reduction module comprises:

a third determining unit, configured for determining, according to a preset photographing magnification and correspondence between definitions of images photographed by the lens group at starting positions of movement and moving speeds, a current photographing magnification and a second speed corresponding to a definition of an image photographed by at a starting position of movement from which the lens group is to be moved; and a third speed reduction unit, configured for reducing the moving speed of the lens group to the second speed.

15. The device according to claim 9, wherein the return module comprises:

a fourth determining unit, configured for determining a third position, wherein the third position is a position shifted from the position of the lens group where the first image was photographed in a direction opposite to a direction in which the lens group moves at the second speed;

a second moving unit, configured for controlling the lens group to move to the third position; and a third return unit, configured for controlling the lens group to return to the position of the lens group where the first image was photographed.

16. The device according to claim 9, wherein the return module comprises:

a third moving unit, configured for controlling the lens group to move in a direction towards the position of the lens group where the first image was photographed;

a fifth determining unit, configured for determining a braking position for the lens group to start braking according to the position of the lens group where the first image was photographed and a preset braking distance;

a sixth determining unit configured for: during the process of controlling the lens group to move in a direction towards the position of the lens group where the first image was photographed, upon each preset detection period, determining a distance to be moved between a current position of the lens group and the braking position, determining a target deceleration distance corresponding to a speed range within which a current speed is according to preset correspondence between speed ranges and deceleration distances, and if a difference between the distance to be moved and the target deceleration distance is less than a preset distance difference, controlling the lens group to start deceleration;

a braking unit, configured for controlling the lens group to start braking when detecting that the lens group decelerates and moves to the braking position, so that the lens group stops at the position of the lens group where the first image was photographed.

17. A non-transitory computer-readable storage medium having at least one instruction, at least one program, code set or instruction set stored thereon which, when loaded and executed by the processor, cause the processor to perform the method according to claim 1.

* * * * *